United States Patent [19]
Amborn et al.

[11] Patent Number: 5,664,463
[45] Date of Patent: *Sep. 9, 1997

[54] CAMSHAFT ASSEMBLY WITH SHAFT ELEMENTS POSITIONED ONE INSIDE THE OTHER AND METHOD OF PRODUCING SAME

[76] Inventors: Peter Amborn, In den Gärten 2, D-53819 Neunkirchen-Seelscheid; Klaus Greulich, Mühlenstrasse 1, D-53547 Breitscheid-Hollig; Helmut Riemscheid, Heiligenstock 53, 53797 Lohmar-Wahlscheid, all of Germany

[*] Notice: The term of this patent shall not extend beyond the expiration date of Pat. No. 5,165,303.

[21] Appl. No.: 206,003

[22] Filed: Mar. 3, 1994

[30] Foreign Application Priority Data

Mar. 3, 1993 [DE] Germany ............ 43 06 620.8
Mar. 3, 1993 [DE] Germany ............ 43 06 621.6

[51] Int. Cl.⁶ ................................................ F16H 53/00
[52] U.S. Cl. .................. 74/567; 123/90.6; 29/888.1; 29/523
[58] Field of Search ............. 74/567–569; 29/888.1, 29/523; 123/90.6, 90.17

[56] References Cited

U.S. PATENT DOCUMENTS

| | | | |
|---|---|---|---|
| 4,620,356 | 11/1986 | Maus et al. | 74/567 |
| 4,949,683 | 8/1990 | Swars | 74/567 X |
| 4,993,282 | 2/1991 | Swars | 74/567 |
| 5,009,123 | 4/1991 | Hiraoka et al. | 74/567 |
| 5,054,334 | 10/1991 | Swars | 29/523 X |
| 5,165,303 | 11/1992 | Riemscheid et al. | 74/567 |
| 5,299,881 | 4/1994 | Mettler-Friedl | 74/567 |
| 5,331,866 | 7/1994 | Voight et al. | 74/567 |
| 5,402,759 | 4/1995 | Ding et al. | 123/90.17 X |
| 5,431,131 | 7/1995 | Kuhn et al. | 123/90.6 |

FOREIGN PATENT DOCUMENTS

| | | | |
|---|---|---|---|
| 3234639 | 3/1984 | Germany | 74/567 |
| 3943426C1 | 4/1991 | Germany . | |
| 3943427C1 | 4/1991 | Germany . | |
| 4008906 | 9/1991 | Germany | 74/567 |
| 58-120809 | 8/1983 | Japan . | |
| 59-206605 | 11/1984 | Japan . | |
| 61-118510 | 6/1986 | Japan . | |
| 64-49610 | 3/1989 | Japan . | |
| 3111607 | 5/1991 | Japan . | |
| 4-136556 | 5/1992 | Japan | 74/567 |
| 4-287806 | 10/1992 | Japan | 74/567 |
| 4350307 | 12/1992 | Japan . | |

*Primary Examiner*—Vinh T. Luong
*Attorney, Agent, or Firm*—Harness, Dickey & Pierce, P.L.C.

[57] ABSTRACT

A camshaft assembly for valve-controlled internal combustion engines, having two shaft elements, an inner shaft and an outer shaft, which are positioned one inside the other, which are supported one inside the other and which are rotatable relative to one another by a limited axial distance, with first cams referred to as inner cams, especially for the inlet valves, being connected to the inner shaft and with second cams referred to as outer cams, especially for the outlet valves, being connected to the hollow outer shaft, the outer shaft comprising wall apertures associated with fixing elements or fixing portions of the inner cams, and the inner cams forming axially open slots or recesses which are shaped like a sector of a circle and which are engaged by axial finger regions of the outer shaft, with the inner cams being connected to the inner shaft by form-fitting mechanisms and with the outer cams being connected to the outer shaft by form-fitting mechanisms and with at least the outer shaft consisting of individual longitudinal portions.

9 Claims, 7 Drawing Sheets

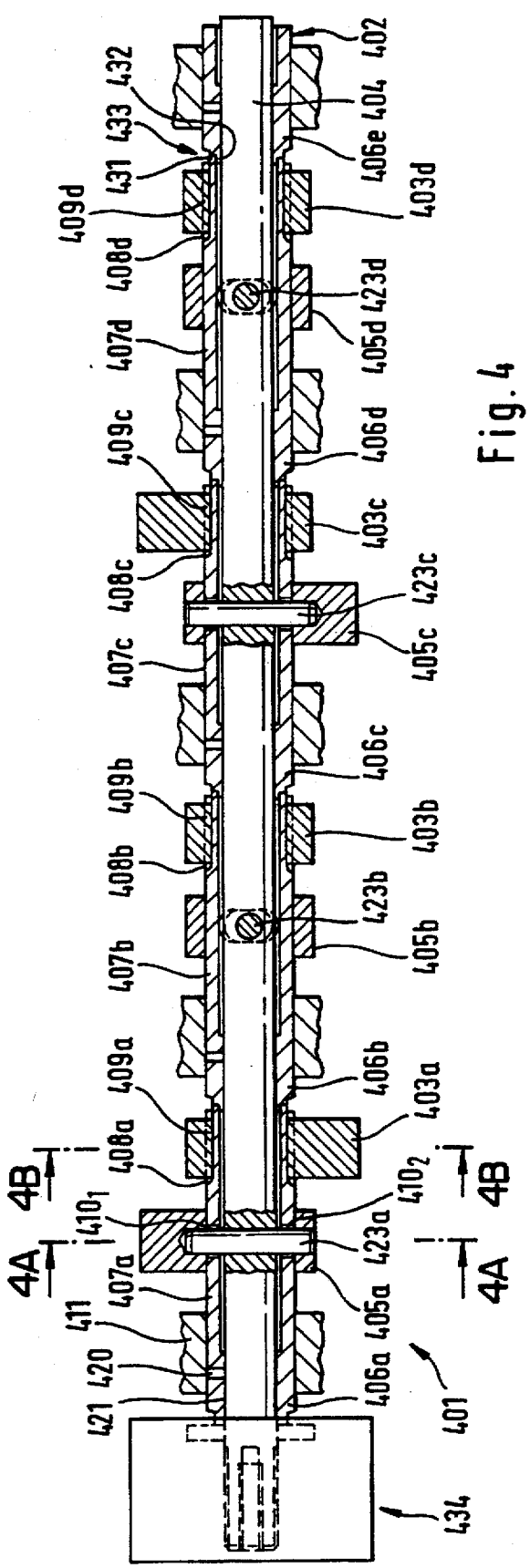
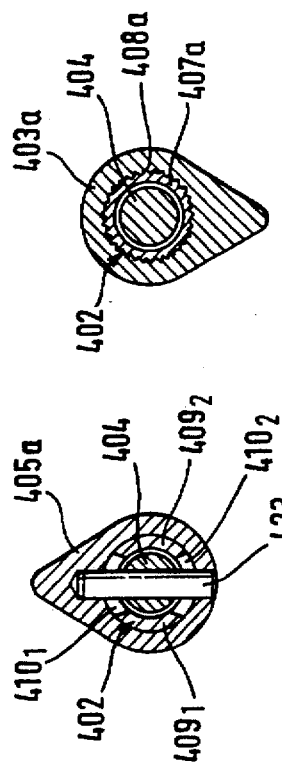
Fig. 4
Fig. 4b
Fig. 4a

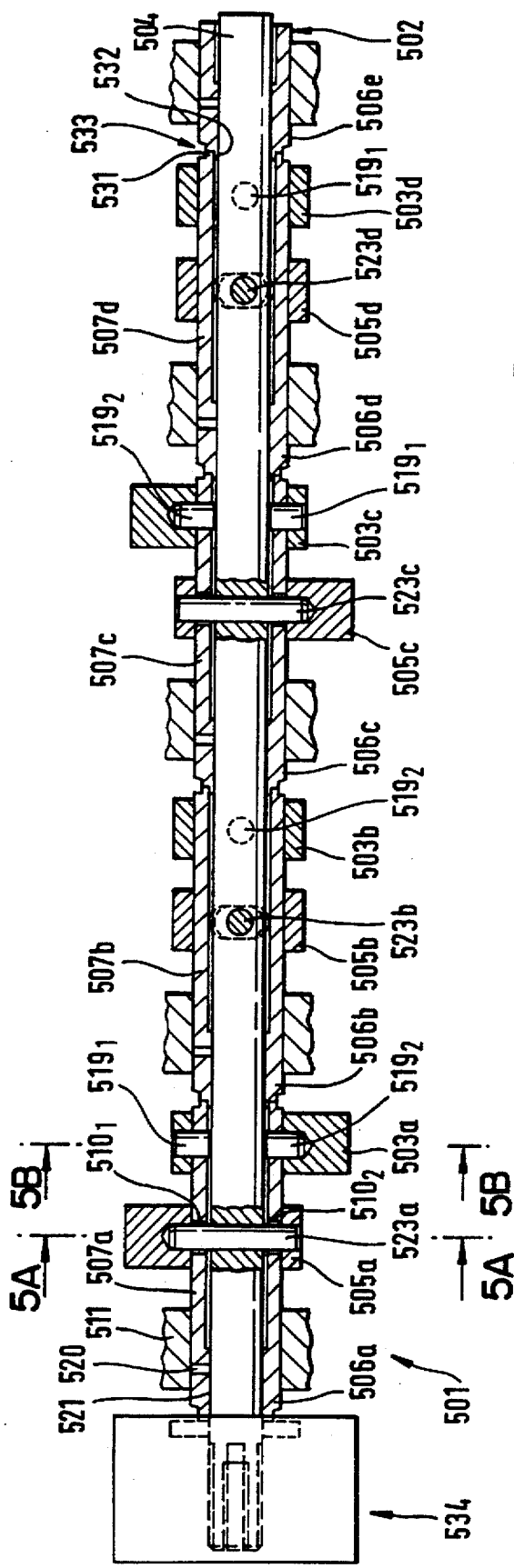
Fig. 5
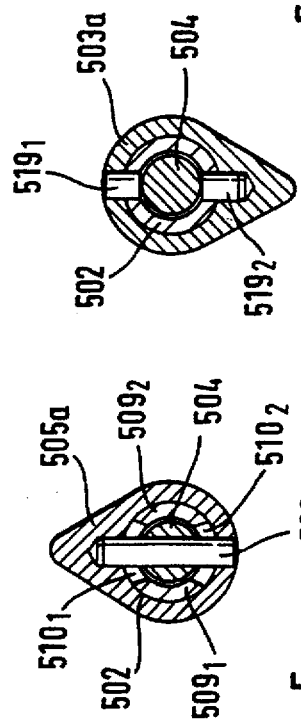
Fig. 5b
Fig. 5a

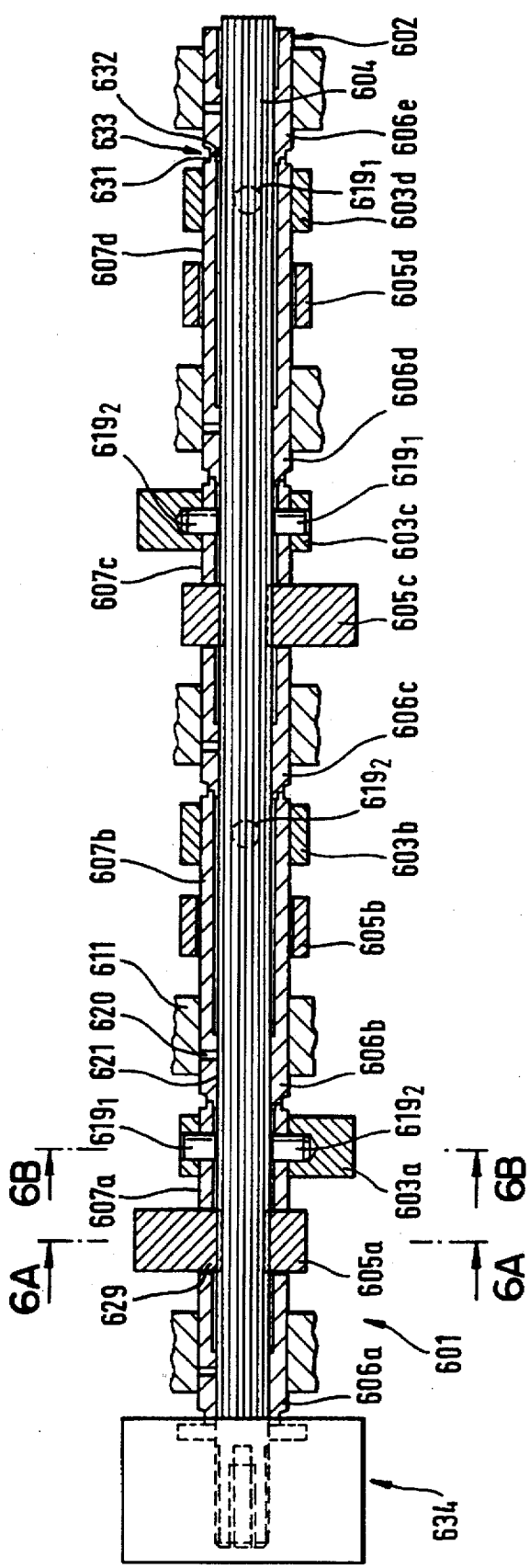
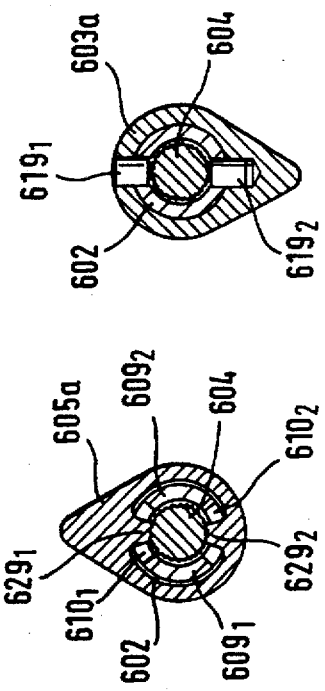
Fig. 6
Fig. 6b
Fig. 6a

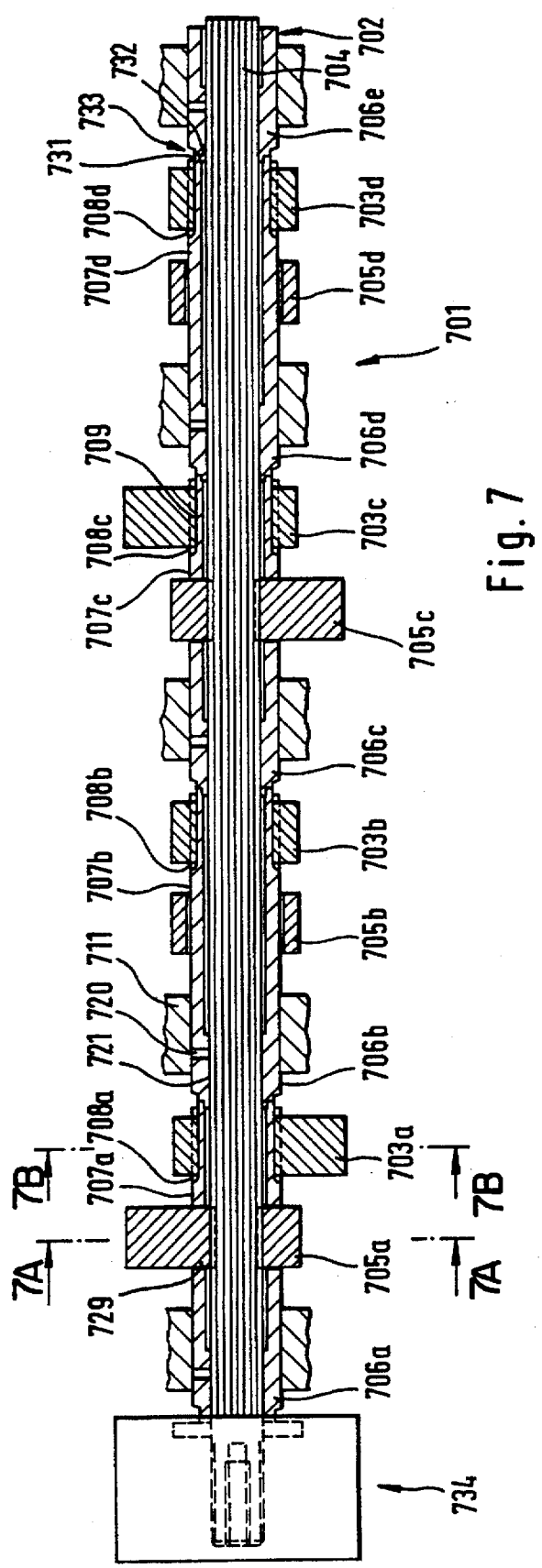
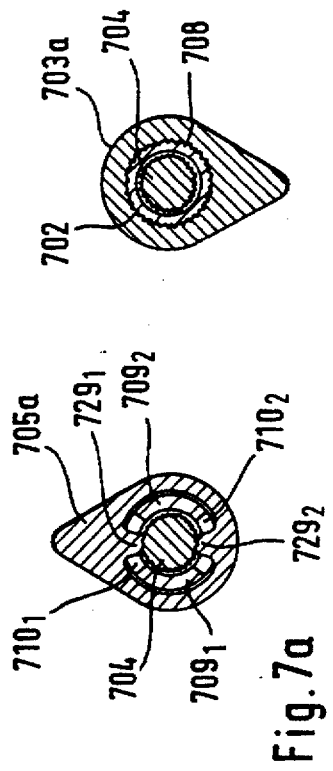
Fig. 7
Fig. 7a
Fig. 7b

CAMSHAFT ASSEMBLY WITH SHAFT ELEMENTS POSITIONED ONE INSIDE THE OTHER AND METHOD OF PRODUCING SAME

BACKGROUND OF THE INVENTION

The invention relates to a camshaft assembly for valve-controlled internal combustion engines. The camshaft assembly has two shaft elements which are positioned one inside the other. The elements are supported one inside the other and are rotatable relative to one another to a limited angle or slidable relative to one another for a limited axial distance. In the case of SOHC engines, the elements allow the inlet cams to be adjusted relative to the outlet cams. The second type of adjustment requires axially variable cam contours at a shaft element the invention makes it possible to change the control times of the inlet valve when the engine is in operation, thereby achieving improved torque characteristics, a reduced fuel consumption and improved exhaust gas values. This is of particular interest as far as diesel engines (charged) are concerned. With such a camshaft, cams referred to below as inner cams are connected to the inner shaft and cams referred to below as outer cams are connected to the outer shaft. The outer shaft includes circumferentially distributed wall apertures associated with the fixing parts of the inner cams and the inner cams include axially open slots or recesses which cover a sector of a circle respectively and which are penetrated by axial finger portions of the outer shaft positioned between the wall apertures respectively.

DE 39 43 427 C1, proposes to produce both the inner cams and the outer cams such that they are integral with the inner shaft and outer shaft respectively and subsequently to join the parts or connect them in a force-locking way to the shaft by inserting them or expanding the respective shaft or to weld them thereto after having been inserted. The first case requires complicated components because simple tube or rod portions can no longer be used for the shaft. The second case requires relatively sophisticated technologies to produce a connection capable of bearing torque loads.

DE 39 43 426 C1, proposes camshaft assemblies of the type where the inner cams are secured to the inner shaft by radially plugged-in pins. The outer cams are connected to the outer shaft by force-locking or material-locking means only, with entirely cylindrical pairs of surfaces being connected by being expanded or shrunk or by welding or soldering.

Finally, in DE 40 08 906 C2, inner cams are secured to the inner shaft by means of radially opposed form-fitting means while temporarily subjecting the inner cams to elastic deformation. The outer cams are connected to the outer shaft by applying prior art force-locking methods involving shaft expansion.

The disadvantage of the shafts referred to above is that for producing the force-locking connection by plastically expanding the shaft parts or by shrinking the cams it is necessary to provide vary accurately machined surfaces and accurate fits in order to obtain a connection capable of bearing torque loads. Under very high torque loads, the connections may temporarily loosen, which leads to the cam being rotated on the shaft. This may result in considerable damage to the internal combustion engine. The methods used for producing a material-locking connection, i.e. soldering or welding, are time-consuming and not suitable for mass production purposes.

SUMMARY OF THE INVENTION

It is an object of the present invention to provide a camshaft assembly of the type which can be produced by simple means and which ensures a high-accuracy connection between the cam and shaft, capable of bearing high torque loads.

The objective is achieved by the inner cams connecting to the inner shaft by form-fitting means and connecting the outer cams to the outer shaft by form-fitting means and at least the outer shaft including individual longitudinal portions which are connected to one another.

As compared to assemblies incorporating force-locking connections, the assemblies in accordance with the invention are easier and cheaper to produce. The centricity and angular position of the attached cams are more accurate and only small tolerances are obtained in respect to the contour of the cam.

According to a first embodiment, it is proposed that longitudinal teeth, constituting the form-fitting means, are provided at the outer shaft and at the outer cams. The teeth are easy to produce in a cam by axial broaching, whereas they may be rolled into the associated outer shaft. The teeth may be produced in portions on individual short shaft pieces of the outer shaft where axial stops for the cams may be produced at the same time. After the cams have been slid on, they may be axially secured by securing rings. After the inner shaft has been mounted, the individual portions of the outer shaft are welded together in stages.

According to a second embodiment, it is proposed that at least one pin passes through the outer shaft and outer cam which constitutes the respective form-fitting means. The solution of providing a form-fitting connection of this type is particularly cost-effective. The connection is produced by a one-piece pin sliding through the entire shaft diameter and into the region of the raised cam portion. It is also advantageous for two individual radial pins to be inserted into a sleeve axially integrally adjoining the outer cams, thus producing the connection with the outer shaft.

According to a further embodiment, it is proposed that radially opposed, circumferentially limited splines constitute the form-fitting means and on the remaining circumference, a gap is provided between the outer cams and the outer shaft. In this way it is possible for the outer cams to be slid on to the outer shaft after elastic deformation which generates a radial play in the region of form-fitting engagement, and subsequently, when the load is removed, the cams spring back and are secured on the outer shaft. Again, this is a very simple and cost effective way of producing the connection.

In accordance with the invention, the outer shaft is assembled of individual axial portions which are welded together to form the outer shaft after they have been slid onto the inner shaft and after the axial finger regions have been slid through axially open slots or recesses, shaped like a sector of a circle respectively, in the inner cams.

A first embodiment to connect the inner cams on the inner shaft includes the inner cams connected to the inner shaft by two radially opposed partial regions only while circumferentially cooperating therewith in a form-fitting way and slots are provided between the inner faces of the cams and the outer face of the inner shaft.

According to a further variant, the inner cams may engage the inner shaft over their entire circumference by means of longitudinal teeth. The slots enabling passage of the outer shaft are provided in the solid material of the inner cams.

A third embodiment already referred to includes the inner cams each connected to the inner shaft by a radially passing pin. The slots which enable passage of the outer shaft are formed by a circumferential gap between the inner cams and the inner shaft, which is interrupted only by the respective pin.

The inner shaft, too, may include individual longitudinal portions which are welded to one another, or it may be produced in one piece.

The inner shaft may be produced from a continuous piece of shaft tube or it may be assembled of individual longitudinal portions, like the outer shaft.

A further object of the invention consists in simplifying and reducing the costs of the production of camshafts of this type. The objective is achieved by the individual longitudinal portions form-fittingly connecting to at least one associated cam. Prior to assembling the individual longitudinal portions, the cams are finish-machined, hardened and ground. Finally, the individual longitudinal portions, with the completed cams secured thereto, are connected to one another.

The sequence of the first two process stages referred to may be reversed. First, the cams are form-fittingly connected to the individual longitudinal portions. Next, the cams are finish-machined or vice versa. In any case, assembling the camshaft constitutes the final process stage, after which no further machining operations take place, especially, it is no longer necessary to grind the cams. This objective can be achieved by carefully aligning the individual longitudinal portions prior to connecting them. The connecting methods may be welding, gluing, soldering or even cold forming in the connecting regions. In a preferred embodiment, the abutting ends of the individual longitudinal portions are provided with centering means adapted to one another.

The production method is preferably carried out in that, in an axial view, at least the outer shaft, including longitudinal portions, is assembled from the center. Alternately, a further cam or a further longitudinal portion is attached to the inner shaft during the production. Subsequently, a further longitudinal portion is attached to the outer shaft during the production.

The longitudinal portions are preferably connected to one another by laser welding. The type Of connection between the cams and the individual longitudinal portions provided in accordance with the invention constitutes a form-fitting connection which is cheap and accurate and represents the simplest way of ensuring the circumferential position and the centric position of the cams on the individual longitudinal portions relative to one another. The circumferential portion of the individual portions to one another may be ensured by projections in the region of the centering means, e.g. a longitudinally extending tongue and groove connection.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawings wherein:

FIG. 4 is a longitudinal sectional view through a third embodiment of a shaft in accordance with the invention, with inner cams secured by journals and the outer cams secured by engaging teeth.

FIG. 4a is a cross sectional view through a shaft according to FIG. 4, along 4A—4A.

FIG. 4b is a cross sectional view through a shaft according to FIG. 4, along 4B—4B.

FIG. 5 is a longitudinal sectional view through a fourth embodiment of a shaft in accordance with the invention, with the inner cams secured by single journals and the outer cams by double journals.

FIG. 5a is a cross sectional view through a shaft according to FIG. 5, along FIG. 5A—5A.

FIG. 5b a cross sectional view through a shaft according to FIG. 5, along line 5B—5B.

FIG. 6 is a longitudinal sectional view through a fifth embodiment of a shaft in accordance with the invention, with the inner cams secure by a form-fitting clamping connection and the outer cams by double journals.

FIG. 6a is a cross sectional view through a shaft according to FIG. 6, along line 6A—6A.

FIG. 6b is a cross sectional view through a shaft according to FIG. 6, along line 6B—6B.

FIG. 7 is a longitudinal sectional view through a sixth embodiment of a shaft in accordance with the invention, with the inner cams connected by a form fitting clamping connection and the outer cams by engaging teeth.

FIG. 7a is a cross sectional view through a shaft according to FIG. 7, along line 7A—7A.

FIG. 7b is a cross sectional view through a shaft according to FIG. 7, along line 7B—7B.

DETAILED DESCRIPTION OF THE PREFERRED EMBODIMENTS

Figure 1:
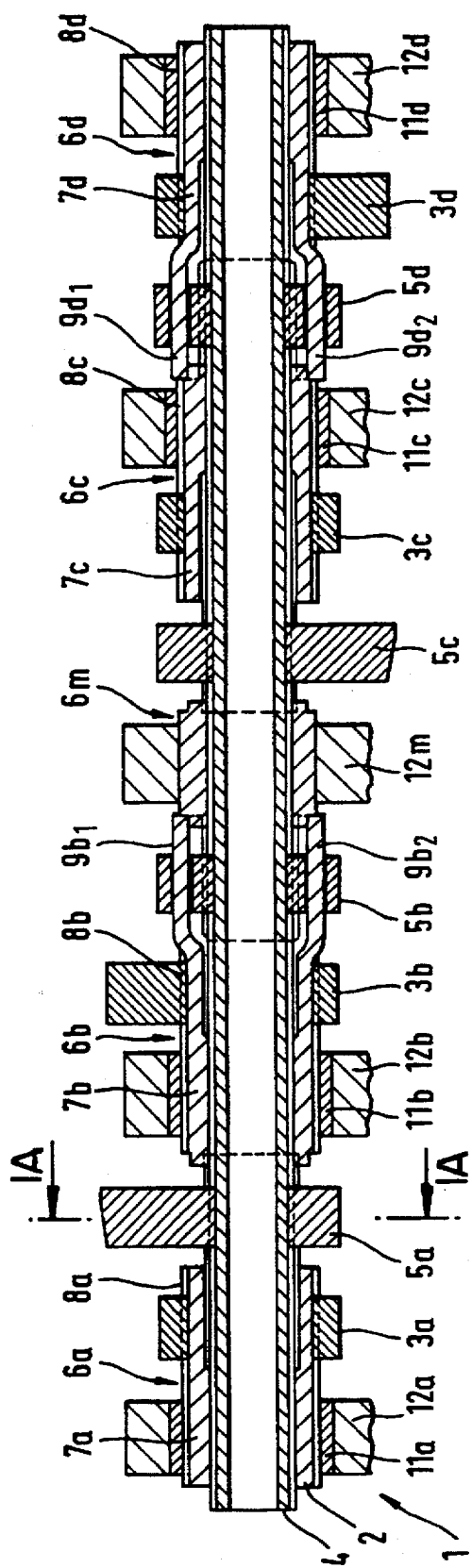
FIG. 1 is a longitudinal view of a first embodiment of a shaft in accordance with the invention, with the inner cams secured on the inner shaft and the outer cams on the outer shaft, in each case by engaging teeth.

FIG. 1 shows a camshaft assembly 1 having an outer shaft 2, carrying outer cams $3a$–$3d$ on its outer circumference, and an inner shaft 4 carrying inner cams $5a$–$5d$ on its outer circumference. The outer shaft includes identical first longitudinal portions $6a$–$6d$ and a central longitudinal portion $6_m$. The inner shaft 4 is produced in one piece.

The longitudinal portions 6 each include a cylindrical portion 7 with outer shaft teeth 8 and adjoining, radially opposed finger portions $9_1$, $9_2$. Only the finger portions $9_{b1}$ and $9_{b2}$ and $9_{d1}$, $9_{d2}$ of the longitudinal portions $6b$ and $6d$ are shown. The respective finger portions of the longitudinal portions 6a and 6c are positioned in front of and behind the drawing plane. The finger portions pass through circumferential slots $10_1$, $10_2$, shaped like a sector of a circle, in associated inner cams 5b and 5d. The respective circumferential slots in the inner cams 5a and 5c also are assumed to be positioned in front of and behind the drawing plane.

The outer cams 3 and bearing cups $11_a$–$11_d$ are axially slid on to the cylindrical portions 7 including the outer teeth 8. The bearing cups run in corresponding friction bearings $12_a$, $12_d$. The outer face of the central tube portion $6_m$ is cylindrical and runs directly in a bearing $12_m$.

The tubular inner shaft 4, along its entire length, is provided with outer teeth 15 accommodating the inner cams $5_a$–$5_d$. The processes of fitting the inner cams on the inner shaft and assembly the longitudinal portions on the outer shaft with the outer cams, take place axially from the center towards the outside. First, the inner cams 5b and 5c are slid on to the inner shaft 4 inserted into the central portion $6_m$. The longitudinal portions 6b and 6c are welded to the central longitudinal portion $6_m$, with the finger portions 9 of the longitudinal portions passing through the circumferential slots 10 in the inner cams $5_b$ and $5_c$. The longitudinal portions $6_b$ and $6_d$ already carry the respective outer cams 3b and 3c and the respective bearing cups 11b and 11d. Subsequently, the inner cams 5a and 5d are mounted on the inner shaft 4. The longitudinal portions 6a and 6d are slid on, with the finger portions 9 slid through the circumferential slots 10 of the latter inner cams 5a and 5d and with the respective longitudinal portions 6 then being welded together. The longitudinal portions 6a and 6d may already carry the associated outer cams 3a, 3d and the bearing sleeves 11a, 11d.

Figure 1A:
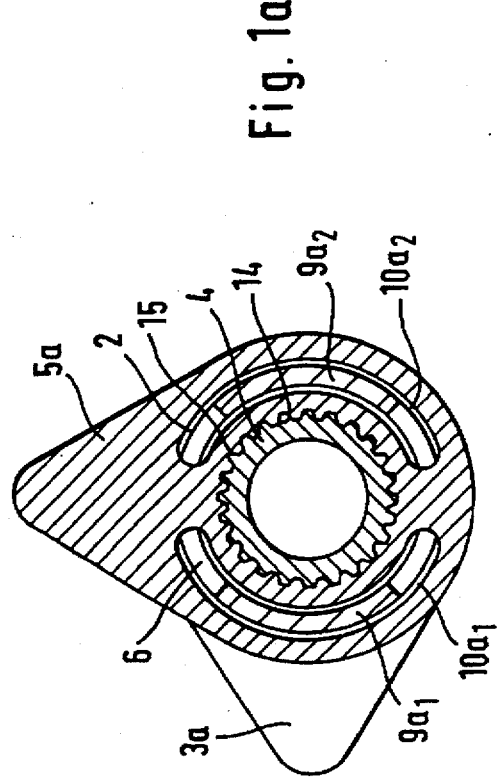
FIG. 1a is a cross sectional view along line 1A—1A through a shaft according to FIG. 1.

The cross section according to FIG. 1a shows the outer teeth 15 at the inner shaft 4. The teeth hold cam 5a with inner teeth 14. Axially extending recesses in the inner cam, arranged in pairs opposite one another, form the circumferential slots 10. The finger portions 9a of the longitudinal portion 6a of the outer shaft axially pass through said slots 10. The outer cam 3a which, around the whole of its inside, is provided with inner teeth, is form-fittingly slid on to the outer teeth 8 of the longitudinal portion 6a (not illustrated). As a result of the relation between the circumferential angles of the fingers 9 and slots 10, the shaft elements 2, 3 are rotatable relative to one another by a limited amount. The fingers 3 include smaller circumferential angles than the slots 10.

Figure 2:
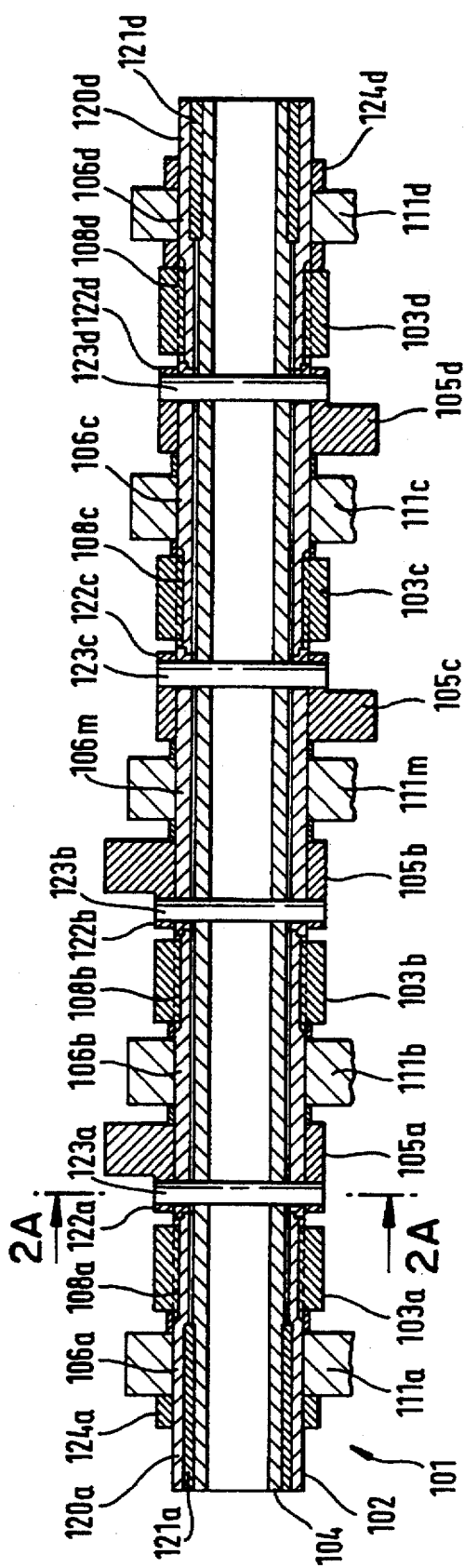
FIG. 2 is a longitudinal sectional view of a second embodiment of a shaft in accordance with the invention, with the inner cams secured to the inner shaft by means of a radial journal and with the outer cams secured on the outer shaft by shaft teeth.

FIG. 2 shows a camshaft assembly 101 with an outer shaft 102 carrying outer cams 103a–103d on its outer circumference, and an inner shaft 104 carrying inner cams 105a–105d at a radial distance from its outer circumference. The inner cams 105 each include sleeve attachments 122, with fixing pins 123 extending radially therethrough. The fixing pins 123 are firmly accommodated in bores in the sleeve attachments and in through-bores of the inner shaft 104. The pins pass through circumferential slots (not illustrated in detail) in the longitudinal portions 106 of the outer shaft.

The outer shaft 102 includes first longitudinal portions 106a, second longitudinal portions 106b and 106c and a central longitudinal portion $106_m$. The inner shaft 104 is produced in one piece. With the exception of the central longitudinal portion, the longitudinal portions each include a cylindrical portion 107 with outer shaft teeth 108. The outer longitudinal portions 106a, 106d include an expanded region 120 which hold a bearing bush 121.

The outer cams 103 and the bearing units $106_m$ are axially slid on to the longitudinal portions 106 with their outer teeth 108. The outer surface of the longitudinal portion $106_m$ is provided in the form of a smooth cylinder and runs in a bearing $111_m$. The assembly, in its entirety, is assembled axially from the center towards the outside. First, the central bearing $111_m$ and the cams 105b and 105c are slid on to the central portion 106 with the inserted inner shaft 104 and secured to the inner shaft 104 by inserting the pins 123b and 123d. Subsequently, the longitudinal portions 106b and 106c are welded to the central portion $106_m$, with the longitudinal portions 106b and 106c already carrying the respective outer cams 103b and 103c. Subsequently, the respective bearings 111 and cams 105a and 105d are slid on, with the latter connected to the inner shaft 104 in the same way as described above. Longitudinal portions 106a, 106d are again slid on, with the longitudinal portions 106 welded to one another. The longitudinal portions 106a and 106c already carry the associated cams 103a, 103d and the bearings 111a, 111d. The bearings are axially secured by sleeves 124a, 124d. Between the bearings and cams spacer sleeves are provided on the outer shaft 102, which are not referred to in greater detail.

Figure 2A:
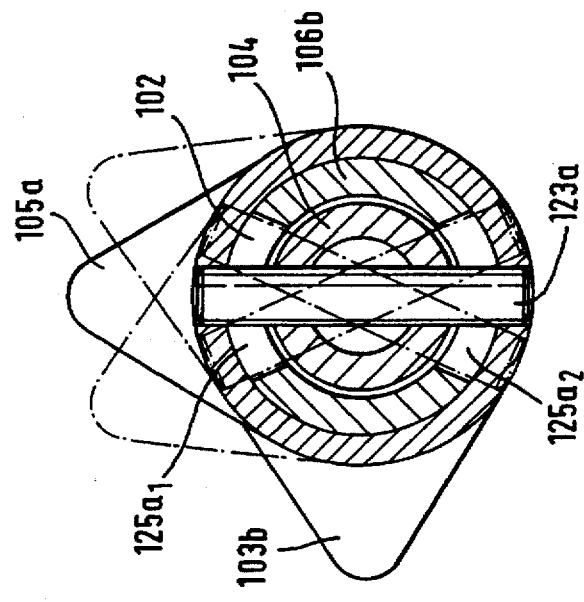
FIG. 2a is a cross sectional view along line 2A—2A through a shaft according to FIG. 2.

The cross section according to FIG. 2a shows the way in which the inner cams 105a are secured on the inner shaft 104 by a pin 123a extending radially in the direction of the raised cam portion through an attached sleeve. The pin is slid through radially opposed circumferential slots 125 in a portion 106 of the outer shaft. The outer teeth 108 (not illustrated) of said portion 106 hold the outer cam 103b.

According to FIGS. 3a–3e, the process of securing the inner cams 205 to the inner shaft 204 may be combined with the process of securing the outer cams 203 to the outer shaft 202. The sections 3a and 3b should be assumed to overlap with the sections 3c to 3e, with the outer tube, behind the drawing plane, having to be given the shape of a finger with two circumferential regions.

Figure 3A:
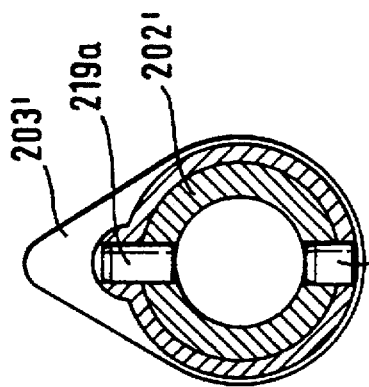
FIG. 3a is a cross sectional view through a first embodiment of an outer cam and an outer shaft to be combined with a shaft according to FIGS. 3c to 3e.
Figure 3B:
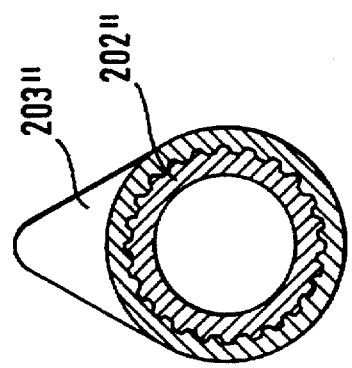
FIG. 3b is a cross sectional view through a second embodiment of an outer cam and an outer shaft to be combined with a shaft according to FIGS. 3c to 3e.

FIG. 3b shows a cross section of an outer cam 203" according to FIG. 1a. The respective tube segment of the outer shaft 202" is shown as an axial section through the region outside the region of the fingers, and is thus shown with its entire circumference.

Figure 3E:
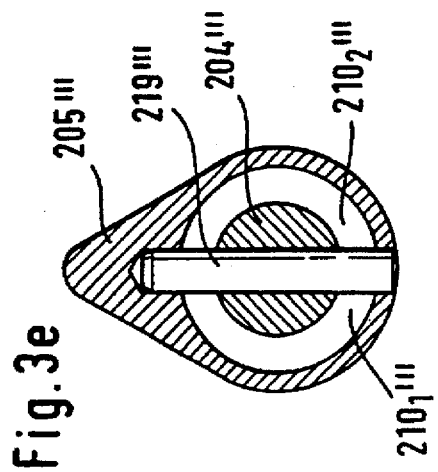
FIG. 3e is a cross sectional view through a third embodiment of an inner shaft and an inner cam, to be combined with an outer shaft according to FIGS. 3a or 3b.
Figure 3D:
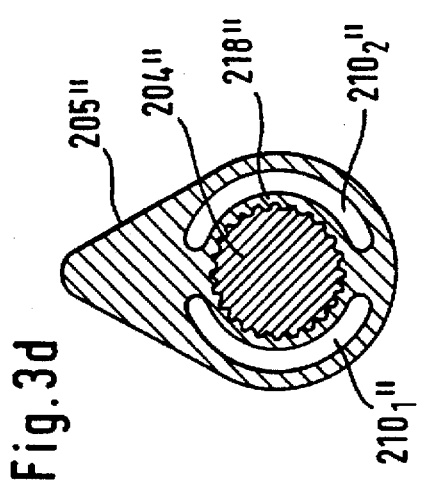
FIG. 3d is cross sectional view through a second embodiment of an inner shaft and an inner cam, to be combined with an outer shaft according to FIG. 3a or 3b.
Figure 3C:
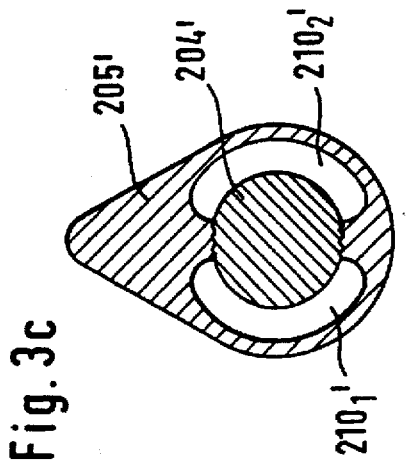
FIG. 3c is a cross sectional view through a first embodiment of an inner shaft and an inner cam, to be combined with an outer shaft according to FIG. 3a or 3b.

FIG. 3c shows an inner cam 205' according to FIG. 1a. The cam is secured to the inner shaft 204' in the same way as illustrated in FIG. 1a. However, the inner shaft 204' is a solid shaft.

FIG. 3d shows a modification in that the circumferential slots 210" are produced in the solid material of the cam 205" so that a complete annular member 218" with inner teeth is positioned on the solid shaft 204" whose outer circumference is fully toothed.

In FIG. 3e, the inner cam 205''' is provided with a complete through-bore. The inner shaft 204''' is unprofiled and provided in the form of a solid shaft. A pin 219''' inserted radially from the outside in the direction of the raised cam portion secures the parts relative to one another and at the same time forms the circumferential slots 210'''.

FIG. 3a shows the outer shaft 202' with a smooth outer surface accommodating an outer cam 203'. The parts are form-fittingly connected by pins 219a, 219b inserted in the direction of the raised cam portion, with the pins inserted from the opposite end of the raised cam portion. The pin 219b has a greater diameter than the pin 219a.

FIG. 4 shows a camshaft assembly 401 having an outer shaft 402 carrying outer cams 403a–d on its outer circumference and an inner shaft 404 carrying inner cams 405a–d at a radial distance from its outer circumference, which slide on the outer shaft. Fixing pins 423 are radially slid through the inner cams 405 in the direction of the raised cam portions. The fixing pins 423 are firmly positioned in coaxial bores in the inner cams and in associated through-bores in the inner shaft 404. The pins pass through the outer shaft 402 in circumferential slots 410 (not shown in detail).

The outer shaft 402 includes identical longitudinal portions 406a–406d and of a final shorter longitudinal portion 406e, whereas the inner shaft is produced in one piece. With the exception of the final portion (e), the longitudinal portions each include a sleeve 407 with outer shaft teeth 408 provided at its end. At the axial end located opposite the shaft teeth, the ends each include inner bearing portions 421 with a lubrication core 420. The outer cams 403a–d and with inner teeth 409a–d nd are axially slid on to the matching outer teeth 408 of the longitudinal portions 406 to be held firmly. The outer surfaces of the sleeves 407 of the longitudinal portions 406 are cylindrical and run in bearings 411 which do not form part of the invention.

The assembly, in its entirety, is preferably assembled from right to left. The longitudinal portion 406e is slid on to the inner shaft 404. Subsequently, the preassembled unit including the longitudinal portion 406d and the slide on end secured cam 403d is added and welded to the longitudinal portion 406e. The inner cam 405d is slid on to the longitudinal portion 406d and secured to the inner shaft 404 by the fixing pin 423d. Subsequently, in the same sequence, the further longitudinal portions 406, with the outer cams 403 already secured thereto, are added and welded on. This operation is followed by the inner cams 405 slid on the sleeves 407 of the longitudinal portions 406 and secured by the fixing pins 423 on the inner shaft 404. At their abutting ends, the longitudinal portions 406 are provided with centering means 431, 432 which engage one another and center the portions. The weld 433 is produced therebetween.

An adjusting device 434, by means of which the two shaft parts (the outer shaft 402 and the inner shaft 404), may be rotated relative to one another is shown in the outline at the end of the camshaft.

FIG. 4a shows a cross section of the inner cam 405a which is secured to the one-piece inner shaft 404 by a radial fixing pin 423. The outer shaft 402, in this section, includes the finger regions $409_1$, $409_2$ between which the circumferential slots $410_1$, $410_2$ are formed, with the fixing pin 423 extending through the slots. As the circumferential angle of the slots 410 is greater than the thickness of the pin 423, the inner shaft 404 is able to rotate relative to the outer shaft 402.

FIG. 4b shows a cross section through the outer cam 403a which, by means of inter-engaging teeth 408, is located on the longitudinal portion 406a of the outer shaft 402. The inner shaft 404 is positioned in the outer shaft 402 with radial play.

FIG. 5 shows a camshaft assembly 501 having an outer shaft 502 carrying outer cams 503a–d on its outer circumference and an inner shaft 504 carrying inner cams 505a–d at a radial distance from its outer circumference, which slide on the outer shaft. Fixing pins 523 radially extend through the inner cams 505 in the direction of the raised cam portions. The fixing pins 523 are firmly positioned in coaxial bores in the inner cams and in associated through-bores in the inner shaft 504 and extend through the outer shaft 502 in circumferential slots 510 (not shown in detail). The outer shaft 502 includes identical longitudinal portions 506a–506d and a final shorter longitudinal portion 506e. The inner shaft is produced in one piece. The longitudinal portions each include an externally smooth sleeve 507. At their one axial end, they each include an inner bearing portion 521 with a lubrication bore 520. At the ends of the longitudinal portions 506 positioned axially opposite the inner bearing portion, outer cams 503 are slid on to the sleeves 507 and secured by two fixing pins $519_1$, $519_2$ which are firmly positioned in coaxial bores in the outer cams 503 and in the longitudinal portion 506. The outer faces of the sleeves 507 of the longitudinal portions 506 are cylindrical and run in bearings 511 which do not form part of the invention.

The assembly, in its entirety, is preferably assembled from right to left. The longitudinal portion 506e is slid on to the inner shaft 504. Subsequently, the preassembled unit including the longitudinal portion 506d, with the cam 503d already slid on and secured, is added and welded to the longitudinal portion 506e. The inner cam 505d is slid on to the longitudinal portion 506d and secured to the inner shaft 504 by means of the fixing pin 523d. Subsequently, in the same sequence, the further longitudinal portions 506, with the outer cams 503 already secured thereto, are added and welded on, whereupon the inner cams 505 are slid on the sleeves 507 of the longitudinal portions 506 and secured by the fixing pins 523 to the inner shaft 504. At their abutting ends, the longitudinal portions 506 are provided with centering means 531, 532 which engage one another and center the portions. A weld 533 is produced therebetween.

An adjusting device 534 by means of which the shaft parts (the outer shaft 502 and the inner shaft 504) may be rotated relative to one another is indicated in outline at the end of the camshaft.

FIG. 5a shows a cross section of the inner cam 505a which is secured to the one-piece inner shaft 504 by the radial fixing pin 523. The outer shaft 502, in this section, includes finger regions $509_1$, $509_2$ between which the circumferential slots $510_1$, $510_2$ are formed, with the pin 523 passing therethrough. Because the circumferential angle of the slots 510 is greater than the thickness of the pins, it is possible for the inner shaft 504 to rotate relative to the outer shaft 502.

FIG. 5b shows a cross section through the outer cam 503a which, by means of two individual radial fixing pins $519_1$, $519_2$, is form-fittingly secured to the longitudinal portion 506 of the outer shaft 502. The inner shaft 504 is positioned with play in the outer shaft 502.

FIG. 6 shows a camshaft assembly 601 having an outer shaft 602 carrying outer cams 603a–d on its outer circumference, and an inner shaft 604 carrying inner cams 605a—also directly on its outer circumference. The inner cams 605, by fixing portions 629, radially extend through the outer shaft 602. The fixing portions 629 are positioned in a force-locking and form-fitting way on the inner shaft 604. They extend through the outer shaft 602 in circumferential slots 610. The outer shaft 602 is composed of identical longitudinal portions 606a–606d and of a final shorter longitudinal portion 606e, whereas the inner shaft is produced in one piece and comprises form-fitting means (not illustrated) for the fixing portions 629 of the inner cams 605. The longitudinal portions each consist of an externally smooth sleeve 607. At their one axial end, they each comprise an inner bearing portion 621 with a lubrication bore 620. The outer cams 603 are axially slid on to the ends of the longitudinal portions 606 positioned axially opposite the inner bearing portions and form-fittingly secured thereto by means of two pressed-in fixing pins $619_1$, $619_2$. Run in bearings 611 are also shown. The outer surfaces of the longitudinal portions 606 are cylindrical. The outer surfaces each comprise finger regions $609_1$, $609_2$ which extend as far as their lefthand ends and which are separated by circumferential slots $610_1$, $610_2$.

The assembly, in its entirety, is preferably assembled from right to left. The longitudinal portion 606e is slid on to the inner shaft 604. Subsequently, the preassembled unit consisting of the longitudinal portion 606d with the cam 603d already slid on and secured is added and welded to the longitudinal portion 606e. Now the inner cam 605d is slid on to the inner shaft 604 and secured in a form-fitting way through engagement of the fixing portions $629_1$, $629_2$. Thereafter, in the same sequence, the further longitudinal portions 606 with the outer cams 603 already secured thereto are added and welded on, whereupon the inner cams 605 are mounted on the inner shaft and secured by the fixing portions 629. The abutting ends of the longitudinal portions 606 are provided with centering means 631, 632 which engage one another and center the portions. The weld 633 is arranged between the longitudinal portions.

An adjusting device 634 by means of which the two shaft parts (the outer shaft 602 and the inner shaft 604) maybe rotated relative to one another is indicated in outline at the end of the camshaft.

FIG. 6a shows a cross section through the inner cam 605a which, by means of fixing portions $629_1$, $629_2$, with form-fitting means, is secured to the inner shaft 604 in a form-fitting and force-locking way. In this section, the outer shaft 602 consists of finger regions $609_1$, $609_2$ only, with circumferential slots $610_1$, $610_2$ thus being formed therebetween. The fixing portions $629_1$, $629_2$ extend through said slots. As the circumferential angle of the slots 610 is greater than the circumferential angle of the fixing portions 629, it is possible for the inner shaft 604 to rotate relative to the outer shaft 602.

FIG. 6b shows a cross section through the outer cam 603a which, by means of two individual radial fixing pins $619_1$, $619_2$, is secured to the longitudinal portion 606 of the outer shaft 602 in a form-fitting way. The inner shaft 604 is positioned in the outer shaft 602 with play.

FIG. 7 shows a camshaft assembly 701 having an outer shaft 702 carrying outer cams 703a–d on its outer circumference, and an inner shaft 704 carrying inner cams 705a–d also directly on its outer circumference. The inner cams 705, by fixing portions 729, radially extend through the outer shaft 702. The fixing portions 729 are positioned on the inner shaft 704 in a force-locking and form-fitting way. They pass through the outer shaft 702 in circumferential slots 710. The outer shaft 702 consists of identical longitudinal portions 706a–d and of a final shorter longitudinal portion 706e. The inner shaft is produced in one piece and comprises form-fitting means (not illustrated) for the fixing portions 729 of the inner cams 705. With the exception of the final portion (e), the longitudinal portions each consist of a sleeve 707 with outer shaft teeth 708 positioned at the end thereof. At the axial end located opposite the shaft teeth, they each comprise inner bearing portions 721 with a lubrication bore 720. The outer cams 703 with inner teeth are axially slid on to the matching outer teeth 708 of the longitudinal portions 706 so as to be held firmly. Run in bearings 711 are also shown. The outer surfaces of the sleeves 707 of the longitudinal portions 706 are cylindrical. The outer surfaces each comprise finger regions $709_1$, $709_2$ which extend as far as their lefthand ends and which are separated by circumferential slots $710_1$, $710_2$.

The assembly, in its entirety, is preferably assembled from right to left. The longitudinal portion 706e is slid on to the inner shaft 704. Subsequently, the preassembled unit consisting of the longitudinal portion 706d with the cam 703d already slid on and secured is added and welded to the longitudinal portion 706e. Now, the inner cam 705d is slid on to the inner shaft 704 and secured in a form-fitting way through engagement of the fixing portions $729_1$, $729_2$. Thereafter, in the same sequence, the further longitudinal portions 706 with the outer cams 703 already secured thereto are added and welded on, whereupon the inner cams 705 are mounted on the inner shaft and secured by the fixing portions 729. The abutting ends of the longitudinal portions 706 are provided with centering means 731, 732 which engage one another and center the portions. The weld 733 is produced between the abutting ends.

An adjusting device 734 by means of which the two shaft parts (the outer shaft 702 and the inner shaft 704) may be rotated relative to one another is indicated in outline at the end of the camshaft.

FIG. 7a shows a cross section of an inner cam 705a which, by means of fixing portions $729_1$, $729_2$ with form-fitting means, is secured to the inner shaft 704 in a form-fitting and force-locking way. In this cross-section, the outer shaft 702 consists of finger regions $709_1$, $709_2$ only, with circumferential slots $710_1$, $710_2$ thus being formed therebetween. The fixing portions $729_1$, $729_2$ extend through said slots. As the circumferential angle of the slots 710 is greater than the circumferential angle of the fixing portions 729, it is possible for the inner shaft 704 to rotate relative to the outer shaft 702.

FIG. 7b shows a cross section through the outer cam 703a which, by means of inter-engaging teeth 708a, is held on the longitudinal portion 706 of the outer shaft 702. The inner shaft 704 is positioned in the outer shaft 702 with play.

While the above detailed description describes the preferred embodiment of the present invention, the invention is susceptible to modification, variation, and alteration without deviating from the scope and fair meaning of the subjoined claims.

We claim:

1. A camshaft assembly for valve-controlled internal combustion engines, comprising:

two shaft elements, an inner shaft and an outer shaft, positioned one inside the other and supported one inside the other;

inner cams connected to said inner shaft;

outer cams connected to the outer shaft;

the inner cams forming slots which cover a sector of a circle and which are penetrated by axial finger portions of the outer shaft, first form-fitting means for connecting said inner cams to the inner shaft, second form-fitting means for connecting said outer cams to the outer shaft and at least the outer shaft including individual longitudinal portions which are connected to one another.

2. A shaft assembly according to claim 1, wherein longitudinal teeth provided at the outer shaft and in the outer cams comprise the respective form-fitting means.

3. A shaft assembly according to claim 1, wherein at least one pin passing through the outer shaft and the outer cam comprises the respective form-fitting means.

4. A shaft assembly according to claim 1, wherein radially opposed, circumferentially limited splines comprise the form-fitting means and on the remaining circumference a gap is provided between the outer cams and the outer shaft.

5. A shaft assembly according to claim 1, wherein the outer cams are axially fixed relative to the outer shaft by securing rings or spacer rings.

6. A shaft assembly according to claim 1, wherein the inner cams are connected to the inner shaft by two radially opposed partial regions only while circumferentially cooperating therewith in a form-fitting way and the slots are provided between the inner faces of the cams and the outer face of the inner shaft.

7. A shaft assembly according to claim 1, wherein the inner cams engage the inner shaft by means of longitudinal teeth and the slots are provided in the solid material of the inner cams.

8. A shaft assembly according to claim 1, wherein the inner cams are each connected to the inner shaft by a radially extending pin and the opening as are formed by a circumferential gap between the inner cams and the inner shaft, the openings being interrupted only by the respective pins.

9. A shaft assembly according to claim 1, wherein the inner shaft is produced in one piece.

* * * * *